United States Patent
Sugino

(10) Patent No.: US 12,369,522 B2
(45) Date of Patent: Jul. 29, 2025

(54) WORK MACHINE SYSTEM AND WORK MACHINE

(71) Applicant: HONDA MOTOR CO., LTD., Tokyo (JP)

(72) Inventor: Tsukasa Sugino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 800 days.

(21) Appl. No.: 17/693,541

(22) Filed: Mar. 14, 2022

(65) Prior Publication Data

US 2022/0312669 A1   Oct. 6, 2022

(30) Foreign Application Priority Data

Mar. 30, 2021 (JP) ................. 2021-058438

(51) Int. Cl.
  *A01D 34/00* (2006.01)
  *A01D 101/00* (2006.01)

(52) U.S. Cl.
  CPC ........ *A01D 34/008* (2013.01); *A01D 2101/00* (2013.01)

(58) Field of Classification Search
  CPC ............ A01D 34/008; A01D 2101/00; G05D 1/0027; G05D 1/005; G05D 1/0238; G05D 1/10257; G05D 1/0297; G05D 1/0038; G05B 19/048; G01S 13/931; G01S 17/931; G01S 15/931
  See application file for complete search history.

(56) References Cited

U.S. PATENT DOCUMENTS

| | | | |
|---|---|---|---|
| 11,209,814 B2 | 12/2021 | Haneda et al. | |
| 11,678,604 B1* | 6/2023 | Melbourne | A01D 34/008 701/25 |
| 12,016,265 B1* | 6/2024 | Matus | A01D 34/008 |
| 2011/0040409 A1* | 2/2011 | Biber | G05D 1/0231 382/110 |
| 2016/0278287 A1* | 9/2016 | Kasai | A01D 34/736 |
| 2016/0320774 A1* | 11/2016 | Kuhara | G05D 1/0287 |

(Continued)

FOREIGN PATENT DOCUMENTS

| | | |
|---|---|---|
| DE | 102016116043 A1 | 3/2018 |
| JP | 2018-106527 A | 7/2018 |
| JP | 2020-089336 A | 6/2020 |

OTHER PUBLICATIONS

German Office Action for German Application No. 102022107220.7 mailed Apr. 4, 2025.

*Primary Examiner* — Mussa A Shaawat
(74) *Attorney, Agent, or Firm* — Thomas Horstemeyer, LLP

(57) ABSTRACT

A work machine system is provided. The system comprises: a first work machine and a second work machine, each being configured to conduct a work in a predetermined work area. The first work machine includes a first position detector to detect a position of the second work machine and a transmitter to transmit, to the second work machine, travel control information in accordance with the position of the second work machine. The second work machine includes a position indicator to display a position for the first work machine and a receiver to receive the travel control information from the first work machine, and a travel controller to control travel based on the travel control information.

11 Claims, 7 Drawing Sheets

(56) References Cited

U.S. PATENT DOCUMENTS

| | | | | |
|---|---|---|---|---|
| 2018/0157260 A1* | 6/2018 | Hayama | ............... | G05D 1/02 |
| 2018/0341814 A1* | 11/2018 | Li | ............... | G08B 13/19663 |
| 2019/0208700 A1* | 7/2019 | Hahn | ............... | G05D 1/0248 |
| 2019/0216011 A1* | 7/2019 | Hahn | ............... | A01D 34/78 |
| 2019/0216014 A1* | 7/2019 | Hahn | ............... | A01D 34/54 |
| 2019/0239502 A1* | 8/2019 | Palomares | ............... | G05D 1/0246 |
| 2020/0042009 A1* | 2/2020 | Yang | ............... | G05D 1/0246 |
| 2020/0150647 A1 | 5/2020 | Haneda et al. | | |
| 2020/0150687 A1* | 5/2020 | Halder | ............... | G05D 1/648 |
| 2021/0219488 A1* | 7/2021 | Zhao | ............... | A01D 34/66 |
| 2021/0232139 A1* | 7/2021 | Ogawa | ............... | G05D 1/0061 |
| 2021/0339382 A1* | 11/2021 | Yaozhang | ............... | H04W 4/80 |
| 2021/0360849 A1* | 11/2021 | Yu | ............... | G05D 1/2446 |
| 2021/0382476 A1* | 12/2021 | Morrison | ............... | G06Q 10/047 |
| 2022/0107497 A1* | 4/2022 | Murata | ............... | B60K 35/00 |
| 2022/0354050 A1* | 11/2022 | Du | ............... | A01D 34/63 |
| 2023/0024763 A1* | 1/2023 | Noh | ............... | G05D 1/028 |
| 2023/0069475 A1* | 3/2023 | Porter | ............... | G05D 1/6484 |
| 2023/0292655 A1* | 9/2023 | Ng | ............... | A01D 34/74 56/10.2 A |
| 2024/0415051 A1* | 12/2024 | Zhao | ............... | A01D 34/84 |

* cited by examiner

WORK MACHINE SYSTEM AND WORK MACHINE

CROSS-REFERENCE TO RELATED APPLICATION(S)

This application claims priority to and the benefit of Japanese Patent Application No. 2021-058438 filed on Mar. 30, 2021, the entire disclosure of which is incorporated herein by reference.

BACKGROUND OF THE INVENTION

Field of the Invention

The present invention relates to a work machine, and more particularly to a work machine system in which a plurality of work machines, such as lawn mowers, operate in cooperation.

Description of the Related Art

In order to efficiently mow grass depending on the size of a lawn ground, various sizes of lawn mowers or unmanned lawn mowers have been proposed and commercially available (See Japanese Patent Laid-Open No. 2018-106527 and Japanese Patent Laid-Open No. 2020-89336).

However, the lawn mowers having large sizes are capable of cutting the lawn on a large lawn ground for a short period of time, but are expensive and cannot be easily transported. In addition, they are unsuitable for mowing small lawn grounds. On the other hand, the lawn mowers having small sizes are suitable for small lawn grounds, are inexpensive and are easily transported. However, it takes a long time to mow large lawn grounds, and they are unsuitable.

SUMMARY OF THE INVENTION

The present invention provides a lawn mower that is operable in a more flexible manner.

The present invention includes the following configurations. That is, according to one aspect of the present invention, there is provided a work machine system including:
a first work machine; and a second work machine, each being configured to conduct a work in a predetermined work area,
the first work machine including:
a first position detector configured to detect a position of the second work machine; and
a transmitter configured to transmit, to the second work machine, travel control information in accordance with the position of the second work machine,
the second work machine including:
a position indicator configured to display a position for the first work machine; and
a receiver configured to receive the travel control information from the first work machine; and
a travel controller configured to control travel based on the travel control information.

In addition, according to another aspect of the present invention, there is provided a first work machine configured to conduct a work in a predetermined work area, the first work machine including:
a first position detector configured to detect a position of a second work machine; and
a transmitter configured to transmit, to the second work machine, travel control information in accordance with the position of the second work machine.

In addition, according to further another aspect of the present invention, there is provided a second work machine configured to conduct a work in a predetermined work area, the second work machine including:
a position indicator configured to display a position for a first work machine;
a receiver configured to receive travel control information from the first work machine; and
a travel controller configured to control travel, based on the travel control information.

According to the present invention, a lawn mower that is operable in a more flexible manner can be provided.

DESCRIPTION OF THE EMBODIMENTS

Figure 1A:
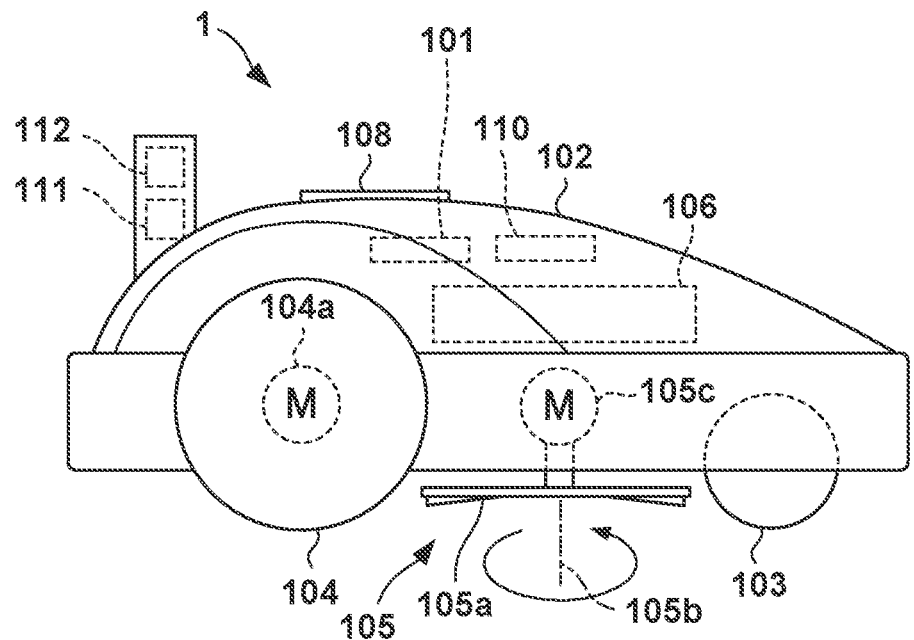
FIG. 1A is a side view of a master work machine according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Configuration of Work Machine

A work machine in the present embodiment is a lawn mower, and advances while rotating a covered blade attached to a lower part of the lawn mower, and cuts grasses and weeds. In addition, the work machines in the present embodiment includes a master work machine that grasps the range of the working site and the position of the work machine by itself to autonomously control the course, and a follower work machine that conducts a work under the control of the master work machine. The master work machine is capable of working on its own, but the follower work machine is not capable of working on its own, and necessitates the master work machine that controls the follower work machine. By increasing or decreasing the number of follower work machines, the lawn mowers in the present embodiment are capable of handling a small working site to a large working site. The number of the follower work machines controllable by the master work machine is limited by the control capability of the master work machine or the like, but is not particularly defined here. A work machine group organized with the master work machine and the follower work machine is also referred to as a work machine system. Next, a configuration of the work machine will be described.

FIG. 1A is a side view of a master work machine 1 according to an embodiment of the present invention. The master work machine 1 in the present embodiment is a lawn mower that conducts a lawn mowing work while moving in a working site (a lawn ground). However, the present invention is also applicable to other types of work machines, such as snow blowers, cultivators, and road paving machines.

The master work machine 1 is a four-wheeled vehicle in which left and right front wheels 103 and left and right rear wheels 104 are supported by a vehicle body 102. The left and right rear wheels 104 are driving wheels, and move the master work machine 1 on the working site. The rear wheels 104 are each provided with a driving mechanism with a motor 104a as a drive source, and the left and right rear wheels 104 are independently subject to rotation control. The left and right rear wheels 104 are independently subject to the rotation control, so that an advancing direction of the work machine 1 becomes controllable. The left and right front wheels 103 are provided to be freely rotatable.

The master work machine 1 includes a working unit 105. The working unit 105 is a mechanism that conducts the lawn mowing work in the working site. The working unit 105 includes a rotary cutter 105a and a driving mechanism that rotates the rotary cutter 105a about a substantially vertical shaft 105b with a motor 105c as a drive source. The rotary cutter 105a is disposed below the vehicle body 102 at a central position in a front-and-rear direction of the work machine 1 (between the front wheels 103 and the rear wheels 104). The rotary cutter 105a in the present embodiment is provided with a blade (cutting edge) so as to cut the lawn in either case where the rotation direction is a forward rotation or a reverse rotation. The working unit 105 may include a lifting mechanism that changes the position in an up-and-down direction of the rotary cutter 105a. The above configuration enables the working unit 105 to conduct the lawn mowing work, while the front wheels 103 and the rear wheels 104 are moving the work machine 1.

An operation panel 108 that receives an operation input of a user is provided at the top of the vehicle body 102. The operation panel 108 may be provided with a display unit, and a touch panel display may be adopted as the operation panel 108. The user is able to input various types of information of the work machine 1 from the operation panel 108. In addition, a global positioning system (GPS) reception unit 101 is provided to specify the position. In particular, it is desirable to use a method with high positional accuracy, for example, real-time kinematic GPS (RTK-GPS).

The master work machine 1 includes a battery 106 as its power source. The battery 106 supplies electric power to an electric load (also referred to as an actuator), such as the motors 104a and 105c, included in the master work machine 1. The battery 106 is chargeable at a charging station.

A control unit 110 is provided to control the master work machine 1. This will be described in detail with reference to FIG. 2. The master work machine 1 further includes a detector 112 for detecting a follower work machine that follows from behind or precedes ahead, and a communication unit 111 for communicating with the follower work machine. In the present embodiment, the detector 112 is a camera, and captures an image in a predetermined range centered behind the master work machine 1. The follower work machine that is controllable by the master work machine 1 is present within an imaging range (a field of view) of the camera. In a case where the detector 112 is a camera, the camera may be configured to be rotatable, and its imaging direction may be variable in order to detect a follower work machine 2 located ahead or behind. In addition, an omnidirectional camera having an imaging range of 360 degrees may be provided.

Figure 1B:
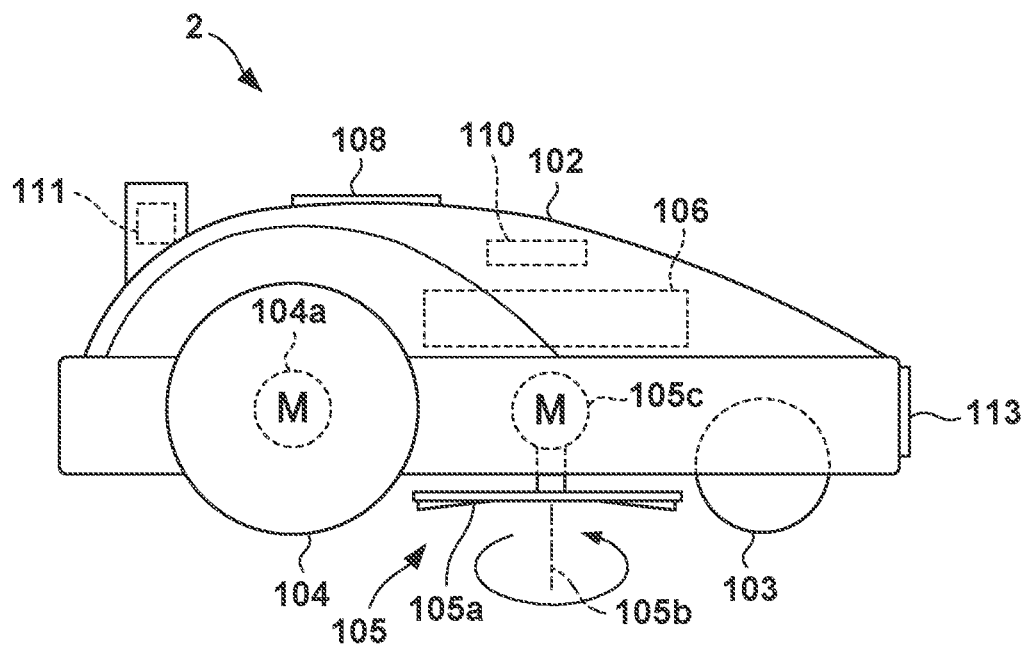
FIG. 1B is a side view of a follower work machine according to an embodiment.

FIG. 1B illustrates a configuration of the follower work machine 2. Descriptions of component parts common to the master work machine 1 will be omitted, and differences will be described. The follower work machine 2 does not include the GPS reception unit 101 or the detector 112, which are included in the master work machine 1. This is because the follower work machine 2 does not autonomously act, and does not control another follower work machine. In contrast, the follower work machine 2 includes an indicator 113 as a component part, which is not included in the master work machine 1. The indicator 113 is attached to the follower work machine 2 to be detectable by the detector 112 of the master work machine 1. In the present embodiment, the indicator 113 emits light of a predetermined pattern by a light emitting diode (LED) or the like provided at an end portion of the main body 102. The work machine works on a lawn ground, a grass ground, or the like. Therefore, the indicator 113 may be provided on an upper part of the main body 102 to be detectable more easily. The indicator 113 is used for specifying the position of the follower work machine 2, and is thus referred to as a position indicator, in some cases. However, the indicator 113 does not display the position directly. Note that in the present embodiment, the follower work machine 2 follows behind the master work machine 1. However, the follower work machine 2 may be located ahead the master work machine 1. Therefore, the indicator 113 may be provided in an upper part of the follower work machine 2 to be visually recognizable from any direction, from ahead or behind the follower work machine 2. In addition, the indicator 113 may be provided at a rear part of the follower work machine 2, or may be provided at both the front part and the rear part.

Control Configuration of Work Machine

Figure 2:
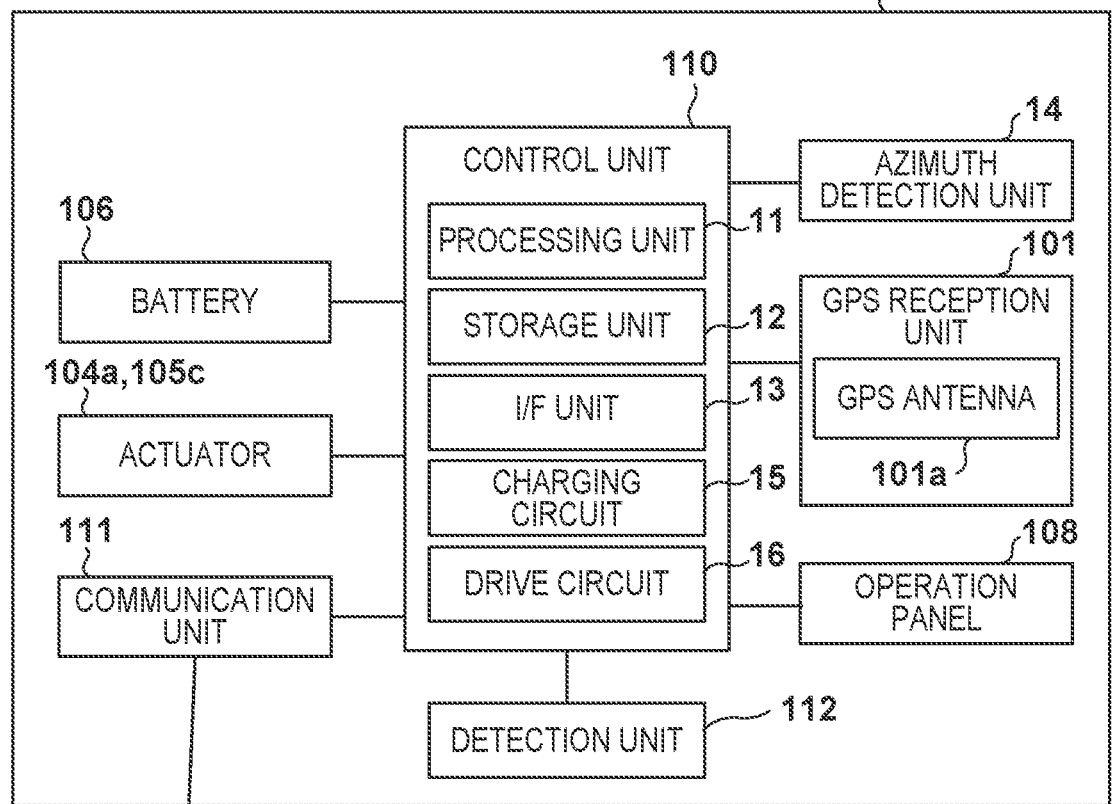
FIG. 2 is a block diagram illustrating a control unit of the master work machine and the follower work machine.
Figure 2:
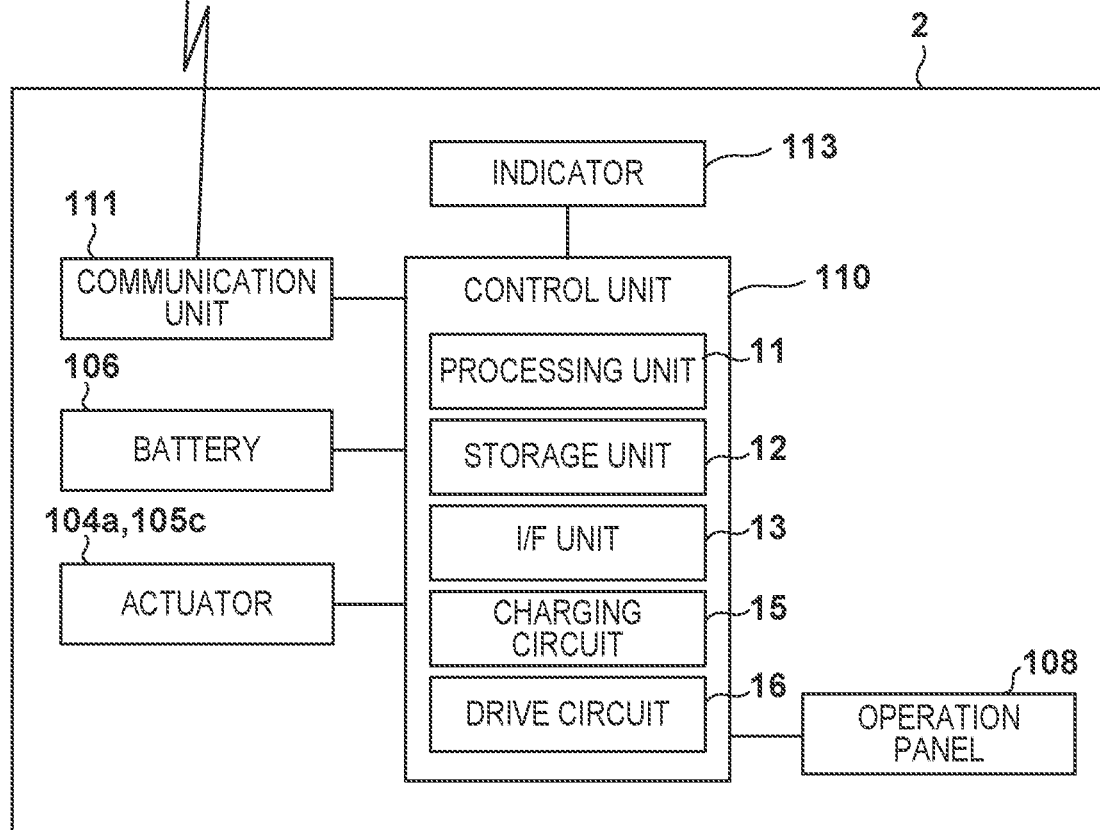

The master work machine 1 and the follower work machine 2 each include a control unit 110 that controls its operation. FIG. 2 is a block diagram illustrating configurations of the control units 110 and surroundings of those work machines.

The control unit 110 includes a processing unit 11, a storage unit 12 such as a random-access memory (RAM) and a read only memory (ROM), and an interface unit (I/F unit) 13 that relays transmission and reception of signals between an external device and the processing unit 11. The processing unit 11 is a processor represented by a CPU, executes a program stored in the storage unit 12, and controls the actuators such as the motors 104a and 105c, based on a direction that has been detected by an azimuth detection unit 14, the position information that has been acquired by the GPS reception unit 101, and map information that has been stored in the storage unit 12. The processing unit 11 conducts control of actuation of the actuators via a drive circuit 16.

The GPS reception unit 101 is an example of a position sensor with use of global navigation satellite system (GNSS), and is a sensor for specifying the current position of the master work machine 1. In addition to this, for example, a sensor, such as a rotary encoder that detects the rotation amounts of the left and right rear wheels 104 may directly detects the rotation amounts of the drive shafts of the rear wheels 104, or may detect the rotation amount of an output shaft of the motor 104*a* so as to detect the position. In such a case, by integrating a travel distance and a direction from, for example, a fixed station to be a reference position, it is possible to acquire a current position with respect to the reference position. In addition, regarding the current position of the master work machine 1, a sensor such as a camera may detect a marker arranged in the working site and specify the current position from a detection result. Alternatively, the current position may be specified from information that has been acquired from a beacon arranged in the working site on wireless communication. Alternatively, the location of the current position may be specified from a relative positional relationship between a point group of light detection and ranging (LiDAR) and the work machine.

The master work machine 1 conducts a lawn mowing work along a route programmed on a map that has been created beforehand, based on the current position that has been specified by GPS reception unit 101. Note that as a method that does not use GNSS, a position determination method called simultaneous localization and mapping (SLAM) using LiDAR is also applicable. LiDAR is a sensor capable of recording reflected light from a surrounding object that is three-dimensional laser irradiation light from a surrounding environment, and is capable of acquiring a detailed three-dimensional point sequence of the surrounding environment (object). The use of SLAM enables estimation of where the self-machine is present by matching the three-dimensional point cloud map from which the data has been acquired beforehand with the point cloud when an actual measurement is made. As one method, there is a method called normal distributions transform (NDT) matching. By using this device and method, it is also conceivable that the location of the current position is estimated, and a predetermined route is traced. In general, a method using GNSS is effective in a place where the sky is open enough to receive signals from a GNSS satellite. Conversely, LiDAR-SLAM is an effective method in an environment where there are structures, trees, and the like in the surroundings.

The control unit 110 also includes a charging circuit 15 that charges the battery 106. The charging circuit 15 is capable of charging the battery 106 with electric power supplied via a power receiving coil and a rectifying unit, which are not illustrated.

The control unit 110 also includes a communication unit 111. The communication unit 111 is capable of communicating with the follower work machine 2 on wireless communication or directly. Accordingly, the master work machine 1 controls the operation of the follower work machine 2. The control of the operation includes an instruction of a target speed and a target turning angle, an instruction of actuation and stop of the working unit 105, and an instruction for a display on the indicator 113. Further, the communication unit 111 may be capable of wirelessly communicating with a management server through a communication network. Accordingly, for example, a map of a work target area (for example, a boundary of the area) by the master work machine 1 can be set in the master work machine 1. In addition, by designating coordinates of vertices of a polygon forming the contour of the work area, it is possible to specify the boundary of the work area. One of the vertices is designated as a reference point, so that the boundary line of the work target area can be specified, based on the reference point.

As the communication standard by the communication unit, concretely, short-range wireless communication such as Bluetooth (registered trademark) or wireless communication such as Wi-Fi or long term evolution (LTE) is used. The communication direction in such a situation may be unidirectional communication from the master work machine 1 to the follower work machine 2 or bidirectional communication. A communication path from the master work machine 1 to the follower work machine 2 is always necessary.

The detector 112 is, for example, a camera fixed to the main body 102, and is capable of capturing an image in a fixed field of view in a direction fixed with respect to the master work machine 1. The camera of the detector 112 is fixed, and it is thus possible to specify a direction and a distance of a corresponding object, in particular, the follower work machine from the object in the image. The camera captures an image at a predetermined frame rate, and acquires the image corresponding to the frame rate. It is desirable to install the camera at a high position so that the follower work machine to be a detection target is not blocked by another object, for example, another follower work machine. In addition, it is also conceivable that there is a case where the follower work machine 2 cannot be detected behind the master work machine 1, because the master work machine 1 is turning. Therefore, it is desirable to use a camera having a wide field of view, for example, an omnidirectional camera. The detector 112 (camera) and the control unit 110 of the master work machine 1 detect the position, the moving direction, the speed, and the like of the follower work machine 2, and thus can be said to constitute a position detector.

The follower work machine 2 also includes component elements common to those of the master work machine 1. Therefore, different parts from those of the master work machine 1 will be mainly described. A communication unit 111 communicates with the communication unit 111 of the master work machine 1. Instructions related to travel, work, and display are mainly received from the master work machine 1. It is needless to say that other information may be received, or some information, for example, the state of the follower work machine 2 or the like may be transmitted to the master work machine 1, as necessary.

The indicator 113 is a component element unique to the follower work machine 2, and in the present example, displays information unique to the follower work machine 2 under the control of the control unit 110. The unique information may be indicated by, for example, a spatial pattern of light emission, a temporal pattern, or a combination thereof. In addition, the follower work machine 2 does not include the azimuth detection unit 14 or the GPS reception unit 101 included in the master work machine 1.

Organization of Work Machines

Figure 3A:
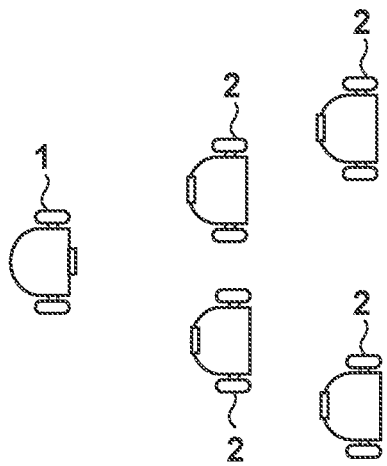
FIGS. 3A, 3B, and 3C are views each illustrating an organization example of the work machines.
Figure 3B:
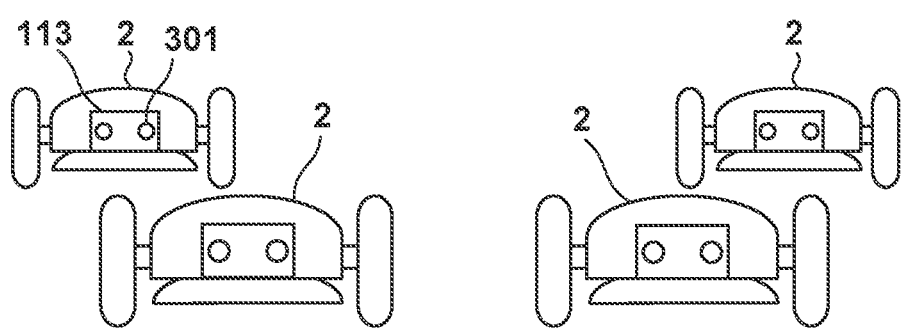
Figure 3C:
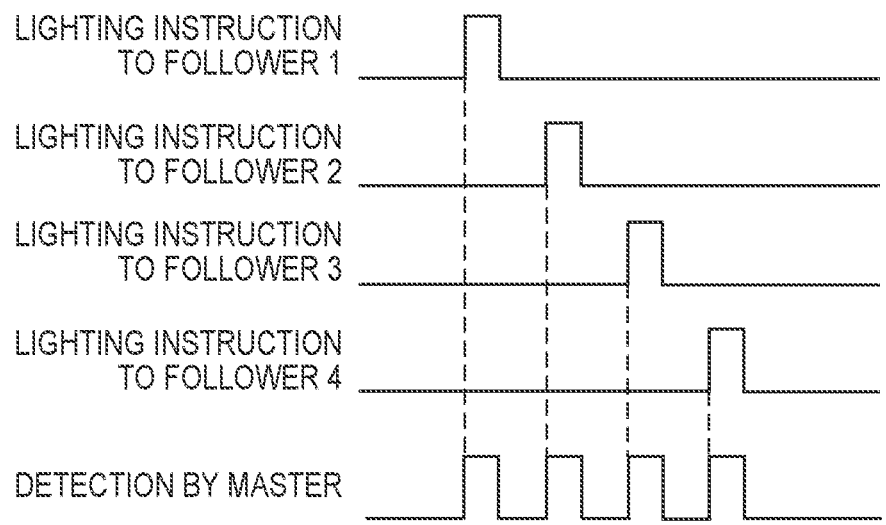

FIGS. 3A to 3C illustrate examples of a work machine group organized with the master work machine 1 and a plurality of follower work machines 2. FIG. 3A illustrates an example in which the master work machine 1 takes the lead of the organization, and four follower work machines 2 are located on left and right sides behind the master work machine 1. This is merely an example, and the follower work machine 2 may be located only on one side of the left and right sides of the master work machine 1. Further, the master work machine 1 may be located at the end in the organization, and the four follower work machines 2 may be located on the left and right sides ahead the master work machine 1. In any case, the follower work machines 2 are arranged so that the work areas of the respective work machines are in contact with each other or partially overlap each other so as not to leave uncut, and the follower work machines 2 advance. For this purpose, the work machines that work in adjacent work areas are located to be shifted in a front-and-rear direction. In addition, the positions of the follower work machines 2 are determined so that at least the indicators 113 of the follower work machines 2 are located within a detection range (for example, the field of view of the camera) of the detector 112. This organization or formation is determined and arranged by the operator at the start of work. However, once the work is started, it is maintained by the master work machine 1.

FIG. 3B illustrates an example of an image that has been captured by the camera of the detector 112 of the master work machine 1. In the image, four follower work machines 2 arranged as illustrated in FIG. 3A are captured. Taking one of them as an example, the indicator 113 is present on its front surface. In its inside, LEDs 301 are arranged one by one on the left and right with a predetermined distance spaced apart from each other. As will be described later, regarding such LEDs, only one LED turns on the light at a time, and the other LED is off.

FIG. 3C illustrates an example of a lighting instruction, by the master work machine 1, for turning on the light of the LED and a detection timing of the light that has turned on. In the master work machine 1, the number of the follower work machines 2 and a destination or identification information (ID) of every follower work machine are set beforehand. The destination or the identification information is set for every follower work machine 2. In this example, it is assumed that four is set as the number of the follower work machines. The four follower work machines are respectively referred to as a follower 1 to a follower 4.

As illustrated in FIG. 3C, the master work machine 1 sequentially transmits the lighting instruction respectively to the followers 1 to 4 at a predetermined time interval. The follower work machine 2, upon reception of the lighting instruction to the follower work machine 2 itself, turns on the light of the LED of the indicator 113 for a certain period of time in response to the instruction. The lighting period is set to a period until the master work machine 1 transmits the lighting instruction to the next follower work machine 2 or a period shorter than that period, and prevents the images in which the plurality of follower work machines turn on the light from being captured simultaneously. This lighting period may be predetermined. In addition, after the lighting instruction, the master work machine 1 detects the lighting from the image during the period while the lighting is expected, and estimates the position and the posture of the follower work machine 2 to which the lighting instruction has been given.

Note that, in this example, the follower work machine 2 simultaneously turns on the light of the two LEDs in response to the instruction, and then turns them off. This is because the detector 112 includes a camera. As the detector, for example, a detector capable of detecting the direction of the LED that has turned on, such as a position sensitive device (PSD) may be used. In this case, the master work machine 1 gives the lighting instruction for turning on the light of each LED of each follower work machine 2, and the follower work machine 2 that has received the instruction turns on the light of the LED that has been instructed, and then turns it off.

Estimation of Position and Posture of Follower

Figure 4A:
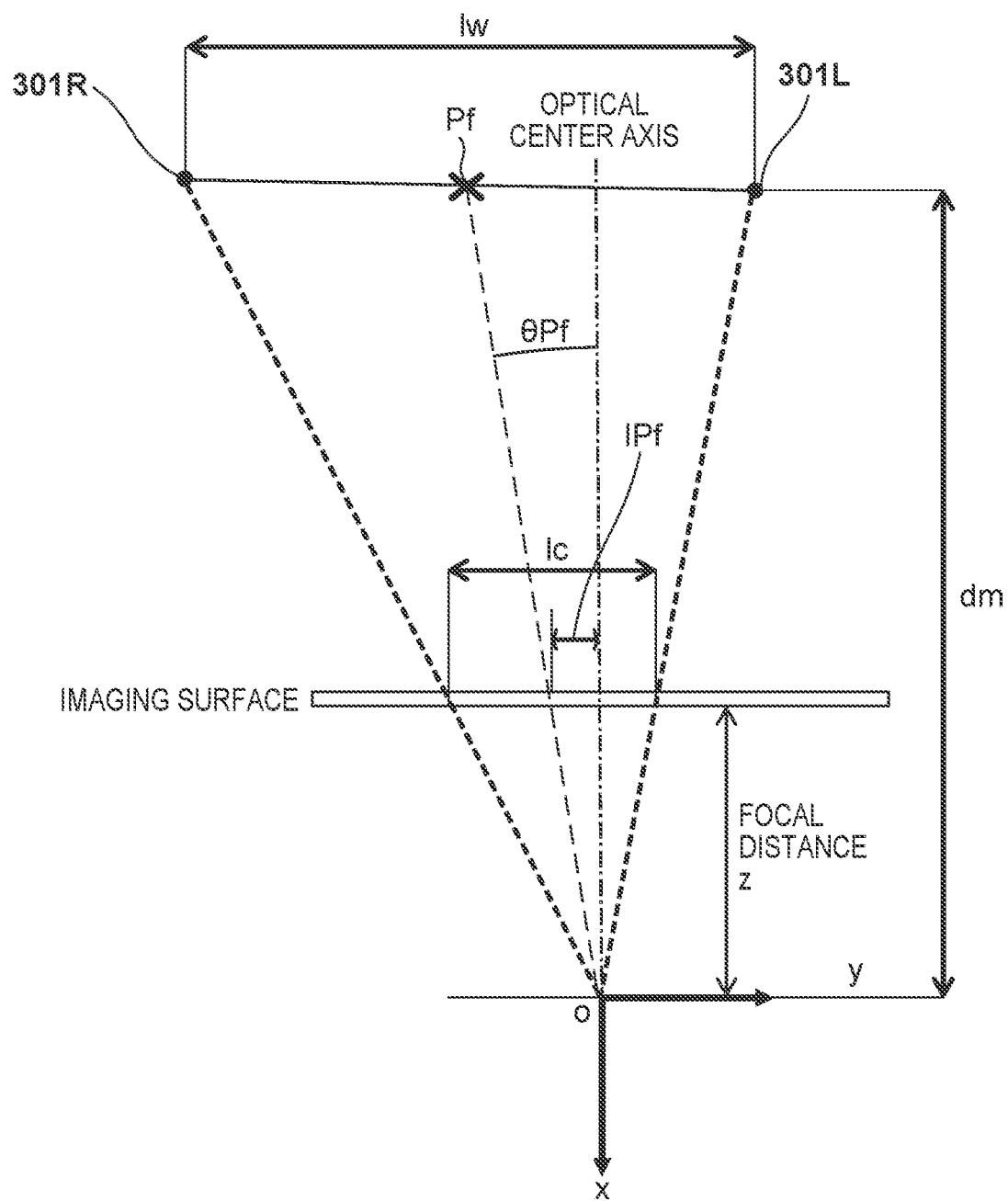
FIGS. 4A, 4B, and 4C are diagrams each illustrating an example of a method for detecting a position and a posture of the follower work machine.
Figure 4B:
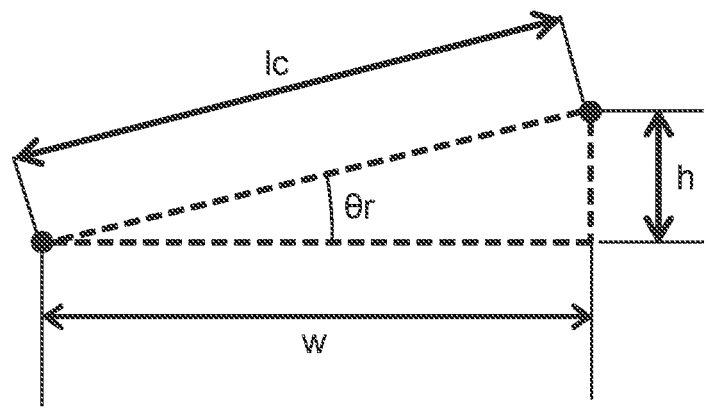
Figure 4C:
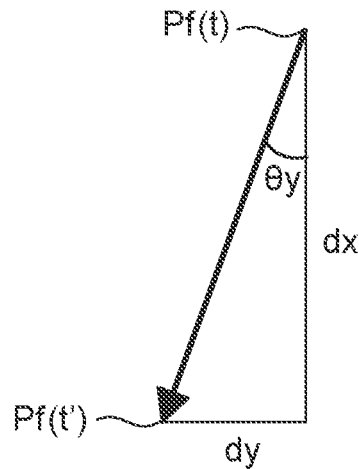

FIGS. 4A to 4C schematically illustrate a method, by the master work machine 1, for estimating the position and the posture of the follower work machine 2. The master work machine 1 estimates a distance between the master work machine 1 and the follower work machine 2 from the space between the two LEDs of the follower work machine 2, and estimates an inclination (a roll angle) of the follower work machine 2 from a vertical inclination of a line connecting between the two LED positions.

First, regarding the distance to the follower work machine 2, a distance lc between the LEDs on an imaging surface is measured, when an image of the indicator 113 of the follower work machine 2 is captured. A focal distance z of the optical system of the camera and a distance lw between actual two LEDs 301R and 301L are known. Hence, a distance dm to the follower work machine 2 can be estimated from these values in the following equation.

$$dm=(lw/lc)z$$

Here, an intermediate part between the two LEDs is defined as a representative position Pf of the follower work machine 2. An azimuth θPf from the master work machine 1 to the representative position Pf is $$\theta Pf=\tan^{-1}(lPF/z)$$

where lPf denotes a distance from the center of the imaging surface to the intermediate position of the two LED images on the imaging surface. In FIG. 4A, θPf denotes an angle formed by a line connecting a point o and the representative position Pf and an optical center line.

With use of this θPf, a distance dPf from the point o to the point Pf is calculated as follows.

$$dPf=\sqrt{(dm^2+(dm\cdot\tan(\theta Pf))^2)}$$

Accordingly, the position of the follower work machine 2 can be specified in a polar axis coordinate system of the distance dPf and the azimuth θPf. It is needless to say that it may be converted into an orthogonal coordinate system.

In addition, a roll angle θr of the follower work machine 2 is obtainable from a horizontal distance w and a perpendicular distance h between the LED images on an imaging element as illustrated in FIG. 4B as follows.

$$\theta r=\tan^{-1}(h/w)$$

Further, a yaw angle of the follower work machine 2 is estimated by observing a temporal change of the representative position Pf of the follower work machine 2. FIG. 4C illustrates an example of the method. Pf(t) denotes a position of a representative point on an image captured at a certain time t, and Pf(t') denotes a position of the representative point on the image captured at a time t', after a predetermined period of time elapses. The speed of the follower work machine 2 is designated by the master work machine 1, and thus its speed v is already known to the master work machine 1. Therefore, a distance dx that has been advanced while the images are captured is v(t'−t). A deviation between the positions of Pf(t) and Pf(t') on the images occurs, in a case where the advancing direction, the speed, or both of them are different from each other with the advancing direction and the speed of the master work machine 1 set as a reference. Here, it is assumed that for the follower work machine 2, the master work machine 1 designates the same speed with the master work machine 1. Then, it can be estimated that the deviation between the positions of Pf(t) and Pf(t') on the images is caused by a deviation in the advancing direction, that is, the yaw angle of the follower work machine 2.

In accordance with such a precondition, in the present embodiment, a distance dy in the horizontal direction between the center positions Pf(t) and Pf(t') is estimated, in the method that has been described with reference to FIG. 4A. Then, the yaw angle θy is estimated from the above-described distance dx in the following equation.

$$\theta y = \tan^{-1}(dy/dx)$$

The distance dm can also be corrected by estimating the yaw angle. The estimation of the distance dm is based on the distance between the two LEDs 301R and 301L. However, this distance also changes depending on the yaw angle of the follower work machine 2. Therefore, a longer distance than the actual distance can be calculated as an estimated value. For this reason, the distance dm that has been described with reference to FIG. 4A is dm=(lw/lc)z. However, here it is assumed that dm'=(lw'/lc)z, where lw'=lw·cos θy. By making a correction in this manner, it is possible to estimate the distance obtained by correcting the yaw angle of the follower work machine 2.

In summarizing the above description, the position of the follower work machine 2 can be estimated as follows, in the case where the yaw angle has been corrected.

Azimuth: $\theta Pf = \tan^{-1}(lPF/z)$

Distance: $dPf = \sqrt{(dm^2 + (dm \cdot \tan(\theta Pf))^2)}$ where $dm = (lw \cdot \cos \theta y/lc)z$, $\theta y = \tan^{-1}(dy/dx)$, Roll angle: $\theta r = \tan^{-1}(h/w)$ where w and h respectively represent the horizontal distance and the perpendicular distance between the LED images on the imaging element.

Yaw angle: $\theta y = \tan^{-1}(dy/dx)$ where dy=the distance in the horizontal direction between the positions Pf(t) and Pf(t'), dx=v(t'−t), v denotes the speed of the follower work machine 2, and t and t' denote times when the images are captured.

Note that regarding the pitch angle of the follower work machine 2, it is necessary to install a pair of markers such as LEDs spaced apart from each other in the vertical direction. However, in the normal operation, the pitch angle is not used for controlling the follower work machine 2, and therefore is not considered here.

Control by Master Work Machine

As described above, the master work machine 1 itself is capable of specifying its position and the direction, and holds a map of a work area (work region) and a planned route that has been set. Therefore, the master work machine 1 travels along the planned route based on these pieces of information, and cuts grasses while traveling. In addition, the master work machine 1 controls the operation of the follower work machine 2. In the master work machine 1, the number of the follower work machines 2 and the formation are also preset. This is, for example, as illustrated in FIG. 3A. The setting may be made by preparing the number and candidates of the formation beforehand, so that a work manager may select an appropriate one of the candidates. The master work machine 1 conducts the work while maintaining the formation that has been set with the number of the follower work machines 2 that have been set. The control of them will be described below.

Figure 6A:
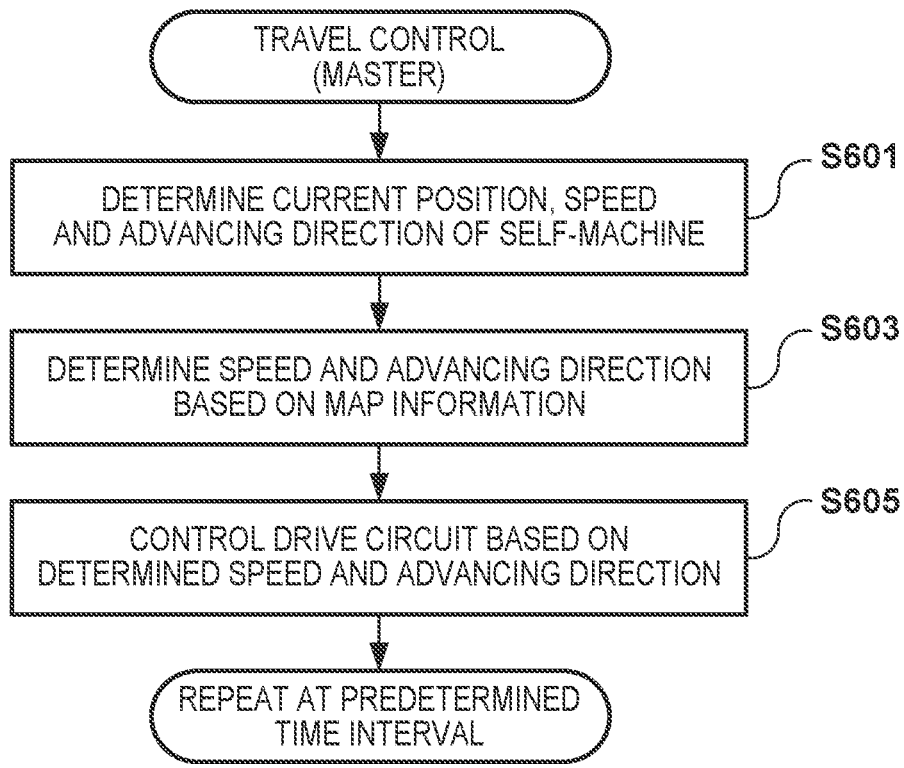
FIGS. 6A and 6B are flowcharts each illustrating an example of a procedure in travel control of the work machines.

FIG. 6A illustrates an example of a procedure of travel control of the master work machine 1 by the master work machine 1. The procedure of FIG. 6A is, in particular, achieved by the processing unit 11 of the master work machine 1 executing a program stored in the storage unit 12. The same applies to the procedure of FIG. 7 to be described later. That is, it can be said that regarding the travel, the processing unit 11 constitutes a travel control unit.

The master work machine 1 determines the current position, the speed, and the advancing direction (S601). The position may be determined by a GPS signal that has been received by the GPS reception unit 101. The wheel speeds are acquired by encoders, not illustrated, respectively provided coaxially with the left and right wheels, and then the speed may be calculated from them. The advancing direction may be based on the direction that has been acquired by the azimuth detection unit 14.

Next, the master work machine 1 determines a direction to advance with reference to the map information or the route information that has been set, and also determines the speed (S603). The speed may be, for example, a preset speed. The direction to advance may follow the preset route.

Finally, the master work machine 1 controls the drive circuit 16 to travel in the determined advancing direction at the speed determined in step S603 (S605). For example, a steering angle that is a difference between a current advancing direction and a target direction to advance is determined, and the rotation speeds of the left and right rear wheels 104 that are driving wheels are controlled in accordance with the steering angle. Furthermore, the rotation speeds of the left and right rear wheels 104 are controlled so that the average of the speeds of the left and right rear wheels becomes a target speed.

The control in step S605 will be described in a little bit more detail. The work machine is turned by a difference made in the rotation speed between the left and right rear wheels 104. At this time, V1 denotes a linear velocity of the rear wheel on a low-speed side, V2 denotes a linear velocity of the rear wheel on a high-speed side, w denotes the space between the left and right rear wheels, and the speed difference Vd=V2−V1. An angular velocity ω at which the work machine turns has a value that satisfies tan ω=Vd/W. That is, $\omega = \tan^{-1}(Vd/W)$. Here, it is assumed that the angular velocity ω in turning at the time of changing the course is fixed, that is, the speed difference Vd between the left and right rear wheels is fixed. In a case where the advancing direction of the work machine is changed by a target turning angle θ, the speed difference Vd may be given to the left and right wheels by the time $t = \theta/w = \theta/\tan^{-1}(Vd/W)$. Note that during this period of time, the inner side of the work machine, that is, the rear wheel on the low-speed side advances by a distance V1 per unit time, and therefore a rotation radius R of the rear wheel on the outer side, that is, on the high-speed side is R=W·(V2/V1).

In addition, it is assumed that Vt denotes a target speed of the work machine, V is a current speed, and V1 and V2 (Vd=V2−V1) respectively denote the target speeds of the left and right rear wheels. In this situation, the linear velocity at the representative position (the center between the marks) is (V1+V2)/2, and Vt=(V1+V2)/2. The speed to be changed is Vt−V with respect to the current speed V, and the speed difference Vd between the left and right wheels may be assigned to the left and right in order to set the center of the left and right wheels to this speed.

From the description above, the target speed Vt and the target turning angle θ are set, and in order to advance at a target speed and in a target direction, it is only necessary to conduct the following control. That is, the rear wheels 104 are controlled to drive such that the speed on an inner side of a curve is set to Vt−(Vd/2) and the speed on an outer side of the curve is set to Vt+(Vd/2) over the period of time t=θ/ω=θ/tan$^{-1}$(Vd/W). In this manner, it becomes possible to cause the work machine to advance at the target speed and in the target direction.

Note that the linear velocity V of the rear wheel can be specified as V=π·r·K from, for example, a rotation speed K of the drive motor and an outer diameter r of the rear wheel. Therefore, in a case where it is assumed that K1 and K2 respectively denote the rotation speeds of the rear wheels on the inner side and the outer side in turning, over the period of time t=θ/w=θ/tan$^{-1}$(Vd/W),
it is only necessary to set $$K1=(Vt-(Vd/2))/(\pi \cdot r),$$

so that the rotation speed of the rear wheel on the inner side in turning is set to satisfy Vt−(Vd/2)=π·r·K1, and to set $$K2=(Vt+(Vd/2))/(\pi \cdot r),$$

so that the rotation speed of the rear wheel on the outer side in turning is set to satisfy Vt+(Vd/2)=π·r·K2.

Here, θ and Vt are variables, and the other numbers can be determined beforehand.

Note that, the angular velocity ω (or the speed difference Vd) in turning is fixed here, but the turning period of time t may be fixed, and the angular velocity ω (or the speed difference Vd) while the work machine is turning may be changed to advance to the target direction at the time t.

Figure 6B:
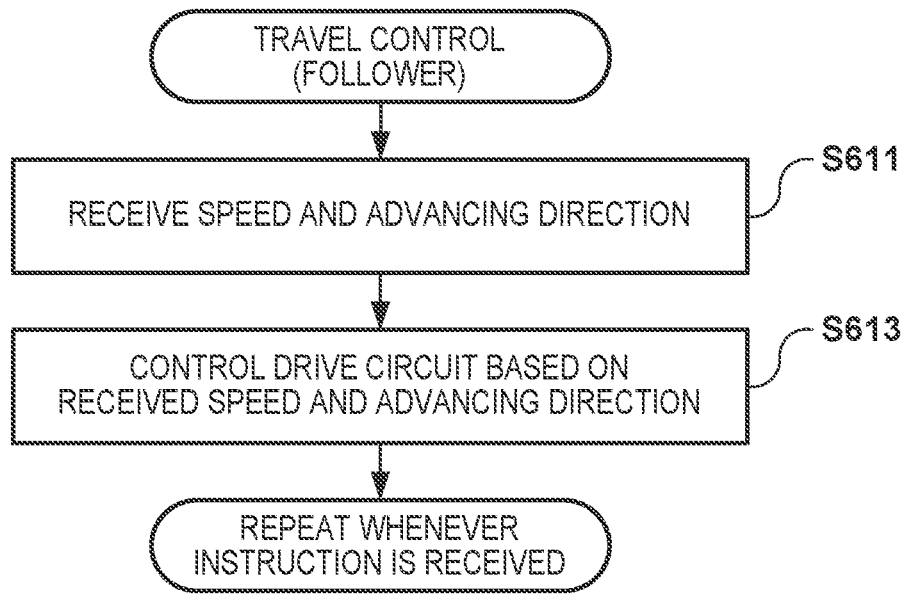

FIG. 6B illustrates an example of a procedure of travel control by the follower work machine 2. The procedure of FIG. 6B is, in particular, achieved by the processing unit 11 of the follower work machine 2 executing a program stored in the storage unit 12.

The follower work machine 2 receives an instruction including the speed and the advancing direction (also referred to as travel control information) from the master work machine 1 (S611). Next, the follower work machine 2 controls the drive circuit 16, based on the speed and the advancing direction that have been received. This control may be conducted in the same manner as described in step S605 of FIG. 6A.

In this manner, the master work machine 1 and the follower work machine 2 advance and conduct the works again. Note that the works have not been described with reference to FIGS. 6A and 6B, but the master work machine 1 actuates the cutter in the work area where to conduct a cutting work, and transmits an instruction to actuate the cutter to the follower work machine 2. The follower work machine 2 actuates the cutter in accordance with the instruction, and conducts the cutting work. In addition, the procedure of FIG. 6A is repeated at a predetermined time interval, and the procedure of FIG. 6B is repeated whenever the instruction from the master work machine 1 is received.

Ideally, the relationship between the master work machine 1 and the follower work machines 2 is as illustrated in FIG. 3A.

However, in reality, the position, the speed, and the traveling direction of each follower work machine 2 may vary due to a factor such as a wheel slip, a control delay, or a detection error. For this reason, the master work machine 1 specifies the position and the direction of the follower work machine 2, and transmits an instruction for correcting them to be ideal. This is the instruction received in step S611 of FIG. 6B.

Figure 7:
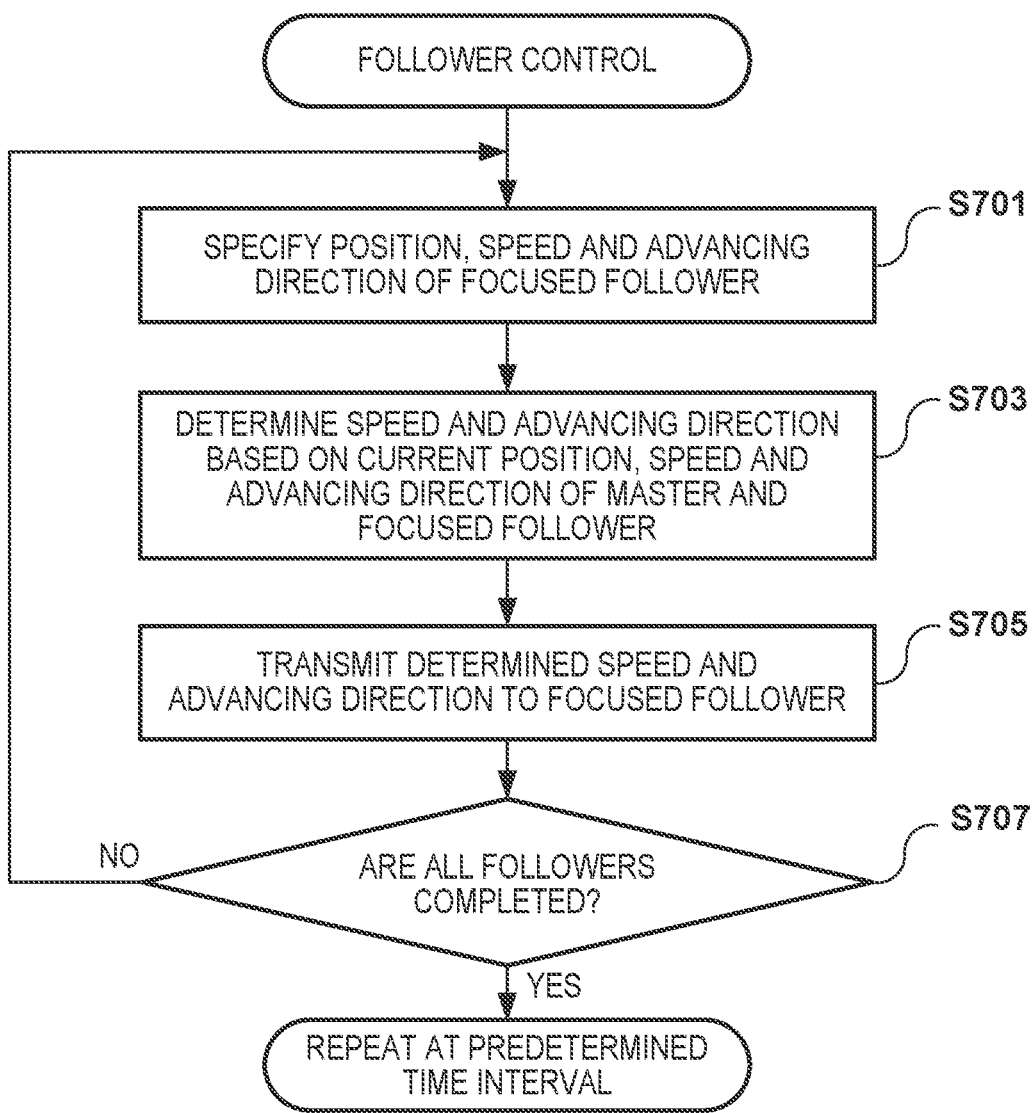
FIG. 7 is a flowchart for detecting, by the master work machine, the position and the posture of the follower work machine.

FIG. 7 illustrates an example of a procedure for the master work machine 1 to transmit an instruction to the follower work machine 2. It is assumed that the procedure of FIG. 7 is performed independently of the procedure of FIG. 6A in the present example, but may be performed continuously after the procedure of FIG. 6A or may be performed before the procedure of FIG. 6A.

Firstly, a specific follower work machine 2 is focused on, and the position, the speed, and the advancing direction of the focused follower work machine 2 are specified (S701). This may be specified by causing the focused follower work machine 2 to emit light from the LED in the manner that has been described with reference to FIGS. 3B and 3C, and it is only necessary if the position and the advancing direction are specified in the manner that has been described with reference to FIGS. 4A to 4C. Regarding the speed, its value may be estimated, but in this example, it is assumed that the vehicle is traveling at an instructed speed. Next, the direction and the speed to be instructed to the focused follower work machine 2 are determined (S703), based on these values, the position, the speed, the advancing direction, and the like of the master work machine 1. Then, an instruction including the direction and the speed that have been determined is transmitted to the focused follower work machine (S705). The above steps are repeated by focusing on all the follower work machines 2 (S707). After the last follower work machine 2 is focused on, the process is repeated from the beginning.

Figure 5:
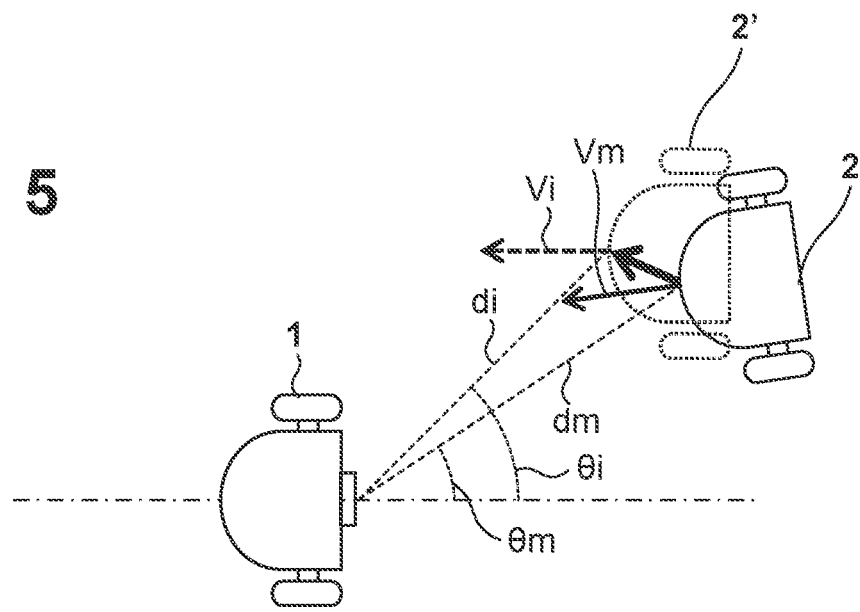
FIG. 5 is a diagram illustrating a control example of the follower work machine.

Here, the determination in step S703 will be described in a little bit more detail. FIG. 5 schematically illustrates a correction of the position of the follower work machine 2. The follower work machine 2 is located at a position indicated by the solid lines, and is advancing. In such a situation, the master work machine 1 specifies a direction Om and a distance dm respectively as the direction and the distance of the follower work machine 2. However, according to the setting, the ideal position is located at a position of a direction Oi and a distance di. Therefore, the master work machine 1 gives, to the follower work machine 2, an instruction of a direction and a speed to move to such a position. At this time, in the present embodiment, the direction to be instructed is a direction with the current advancing direction of the follower work machine 2 set as a reference. Therefore, the master work machine 1 has to specify the advancing direction of the follower work machine 2, but such an advancing direction can be estimated as a yaw angle of the follower work machine 2 that has been already described. In this manner, the master work machine 1 determines the advancing direction and the speed to be instructed for every follower work machine 2.

As described heretofore, according to the present embodiment, the master work machine instructs the operation of the follower work machine, and the follower work machine operates in accordance with the instruction. Therefore, it is no longer necessary for the follower work machine to include a component element for autonomously operating. The follower work machine does not have to include, for example, the configuration for specifying the position of the self-machine, or does not have to determine the operation of the self-machine. Accordingly, it is possible to supply the follower work machine inexpensively. Furthermore, the follower work machine that is inexpensive is added to enable the organization corresponding to the work area inexpensively and easily.

Second Embodiment

In the first embodiment, the master work machine 1 is a work machine that operates autonomously. On the other hand, the master work machine may be manually operated, and may be a riding type or a hand push type, for example. In such a case, the master work machine may not necessarily include a function of grasping a map or a position of the self-machine (a GPS receiver or the like) or a function of autonomously conducting steering control or speed control. This is because an operator performs these operations. However, the function of specifying the position, the speed, and the advancing direction of the follower work machine 2 to control the follower work machine 2 is needed after all also in the present embodiment.

Third Embodiment

Figure 8:
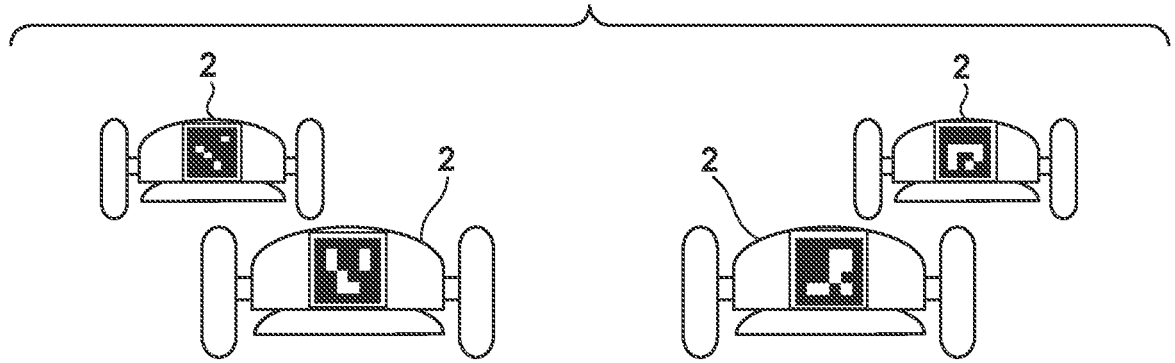
FIG. 8 is a diagram illustrating another example of a display of the follower work machine.

In the first embodiment, an LED is adopted for the indicator 113. On the other hand, on the indicator 113, for example, a two-dimensional marker called an ArUco marker is displayed on the indicator 113. This marker has a unique pattern for every follower work machine. FIG. 8 illustrates an example. The markers respectively having unique patterns are attached to the follower work machines 2, as the indicators 113. The master work machine 1 recognizes each follower work machine 2 from the image that has been captured by the camera of the detector 112, and detects the position and the posture of each follower work machine 2. The use of such ArUco markers as the indicators 113 enables a plurality of follower work machines 2 to be simultaneously detected. Therefore, in the present embodiment, in the procedure of FIG. 7, the focused follower work machine may be specified from the latest image captured in step S701, or all the follower work machines may be specified in step S701, and steps S703 and S705 may be repeated for each follower work machine. In addition, it is also conceivable that a plurality of ArUco markers is mounted on one follower work machine so as to improve the measurement accuracy of the position and the posture. It is assumed that information about which ArUco marker is mounted on which follower work machine is recorded beforehand in the storage unit 12 of the master work machine 1 via the user interface. Further, the marker may also include a mark for measuring the distance, in addition to the mark for uniquely identifying the follower work machine. Alternatively, the distance may be estimated with the width of the focused follower work machine, the image of which has been captured by the camera, set as a reference. This is the same as the first embodiment.

Note that in the present embodiment, in order to detect the ArUco marker from the master work machine 1 located ahead or behind the follower work machine 2, the same marker may be provided on at least two positions in a front part and a rear part of the follower work machine 2. Further, the same marker may be provided on the left and right side parts, so that the marker can be detected from a lateral side.

According to the present embodiment, it is no longer necessary for the indicator 113 to include a component part such as an LED or its control, so that the follower work machine can be configured more inexpensively.

Fourth Embodiment

In an environment of mowing lawn and grass, the camera of the detector 112 or the indicator 113 may be covered with or hidden by dirt due to soil or dust on the lawns. In order to handle this, a wireless position recognition method is adopted in the present embodiment. The wireless method includes a method using Wi-Fi (registered trademark), Bluetooth (registered trademark), a beacon, ultra wide band (UWB), and the like. This is a method in which the distance between a transmitter and a receiver is made detectable by the receiver receiving a signal from the transmitter. Two receivers are prepared to be capable of additionally detecting the direction in accordance with the principle of triangulation. In these years, there are single receivers capable of detecting the distance and the direction. The use of the wireless method facilitates specifying the position, the advancing direction, the speed, and the like of the follower work machine 2, even when the camera or the indicator is covered with dirt or becomes dirty, or blocked by the follower work machine. Note that for specifying the follower work machine with radio waves, a specific frequency different depending on the follower work machine can be used, or a spread code different from each other can be used.

Summary of Embodiments

The above embodiments disclose at least the following systems and devices.

1. A work machine system in the above-described embodiment is
    a work machine system including: a first work machine; and a second work machine, each being configured to conduct a work in a predetermined work area,
    the first work machine including:
    a first position detector configured to detect a position of the second work machine; and
    a transmitter configured to transmit, to the second work machine, travel control information in accordance with the position of the second work machine,
    the second work machine including:
    a position indicator configured to display a position for the first work machine; and
    a receiver configured to receive the travel control information from the first work machine; and
    a travel controller configured to control travel based on the travel control information.

This configuration enables the first work machine to control the second work machine that does not have an autonomous control capability.

2. In the work machine system in the above-described embodiment,
    the travel control information includes a target speed and a target turning angle of the second work machine.

This configuration enables the second work machine to move at a speed and in a direction in accordance with an instruction from the first work machine.

3. In the work machine system in the above-described embodiment,
    the first position detector optically detects a display of the position by the position indicator.

This configuration enables the position of the second work machine to be detected with high accuracy.

4. In the work machine system in the above-described embodiment,
    the position indicator includes a marker in which a predetermined pattern is recorded.

This configuration enables the second work machine to be configured more inexpensively.

5. In the work machine system in the above-described embodiment,
the pattern includes a unique pattern for every second work machine, and
the first position detector detects a position of every second work machine, based on the pattern.

This configuration enables individual identification of the second work machine and estimation of each position.

6. In the work machine system in the above-described embodiment,
the position indicator includes a light emitting unit configured to display a predetermined pattern.

This configuration enables the detection of the second work machine, even in a situation in which the position indicator is hardly recognized because of dirt or the like.

7. In the work machine system in the above-described embodiment,
the position indicator emits light in response to an instruction from the first work machine, and
the first position detector detects the position of every second work machine, based on the pattern.

This configuration enables individual recognition of the second work machine from the pattern and estimation of each position.

8. In the work machine system in the above-described embodiment,
the position indicator displays toward at least one of ahead or behind the second work machine, and
the first position detector detects the display by the position indicator of the first work machine.

This configuration enables the first work machine located ahead to control the second work machine located behind or ahead, and achieves the works in a formation.

9. In the work machine system in the above-described embodiment,
the position indicator transmits a signal of a specific frequency to display the position, and
the first position detector detects the signal of the specific frequency, and detects the position of the second work machine, based on the signal that has been detected.

This configuration enables the first work machine to control the second work machine, even in an environment in which the second work machine is optically undetectable.

10. In the work machine system in the above-described embodiment,
the first work machine further includes:
a second position detector configured to detect a position of the first work machine; and
a travel controller configured to control travel of the first work machine, based on the position that has been detected by the second position detector.

This configuration enables the first work machine to autonomously conduct a work and additionally control the second work machine, and enables the formation of the work machines to autonomously operate.

11. In the work machine system in the above-described embodiment,
the first work machine further includes a travel controller configured to control travel in response to an operation by an operator.

This configuration enables the first work machine manually operated to control the second work machine, and enables the formation of the work machines to autonomously operate.

12. A first work machine in the above-described embodiment is
a first work machine configured to conduct a work in a predetermined work area, the first work machine including:
a first position detector configured to detect a position of a second work machine; and
a transmitter configured to transmit, to the second work machine, travel control information in accordance with the position of the second work machine.

This configuration enables control of the second work machine to conduct a work.

13. A second work machine in the above-described embodiment is
a second work machine configured to conduct a work in a predetermined work area, the second work machine including:
a position indicator configured to display a position for a first work machine;
a receiver configured to receive travel control information from the first work machine; and
a travel controller configured to control travel, based on the travel control information.

This configuration enables the second work machine to conduct a work in response to an instruction from the first work machine, although the second work machine is not capable of autonomously acting.

The invention is not limited to the foregoing embodiments, and various variations/changes are possible within the spirit of the invention.

What is claimed is:

1. A work machine system comprising: a first work machine; and a second work machine, each being configured to conduct a work in a predetermined work area,
the first work machine including:
a first position detector configured to detect a position of the second work machine, periodically; and
a transmitter configured to transmit, to the second work machine, travel control information in accordance with the position of the second work machine,
the second work machine including:
a position indicator configured to display a position for the first work machine; and
a receiver configured to receive the travel control information from the first work machine; and
a travel controller configured to control travel based on the travel control information in accordance with reception of the travel control information,
wherein the position indicator emits light of a predetermined pattern in response to an instruction from the first work machine, and
the first position detector detects the position of every second work machine, based on the predetermined pattern.

2. The work machine system according to claim 1, wherein
the travel control information includes a target speed and a target turning angle of the second work machine.

3. The work machine system according to claim 1, wherein
the first position detector optically detects a display of the position by the position indicator.

4. The work machine system according to claim 1, wherein
the position indicator includes a marker in which a predetermined pattern is recorded.

5. The work machine system according to claim 4, wherein
the pattern includes a unique pattern for every second work machine, and
the first position detector detects a position of every second work machine, based on the pattern.

6. The work machine system according to claim 3, wherein
the position indicator displays toward at least one of ahead or behind the second work machine, and
the first position detector detects the display by the position indicator of the second work machine.

7. The work machine system according to claim 1, wherein
the position indicator transmits a signal of a specific frequency to display the position, and
the first position detector detects the signal of the specific frequency, and detects the position of the second work machine, based on the signal that has been detected.

8. The work machine system according to claim 1, wherein
the first work machine further includes:
a second position detector configured to detect a position of the first work machine; and
a travel controller configured to control travel of the first work machine, based on the position that has been detected by the second position detector.

9. The work machine system according to claim 1, wherein
the first work machine further includes a travel controller configured to control travel in response to an operation by an operator.

10. A first work machine configured to conduct a work in a predetermined work area, the first work machine comprising:
a first position detector configured to detect a position of a second work machine, periodically; and
a transmitter configured to transmit, to the second work machine, travel control information in accordance with the position of the second work machine,
wherein the second work machine has a position indicator that emits light of a predetermined pattern in response to an instruction from the first work machine, and
the first position detector detects the position of every second work machine, based on the predetermined pattern.

11. A second work machine configured to conduct a work in a predetermined work area, the second work machine comprising:
a position indicator configured to display a position for a first work machine;
a receiver configured to receive travel control information from the first work machine; and
a travel controller configured to control travel, based on the travel control information in accordance with reception of the travel control information,
wherein the position indicator emits light of a predetermined pattern in response to an instruction from the first work machine, and
the first work machine has a first position detector that detects the position of the second work machine, based on the predetermined pattern.

* * * * *